US012754159B2

(12) United States Patent
Iketani et al.

(10) Patent No.: US 12,754,159 B2
(45) Date of Patent: Oct. 6, 2026

(54) SAMPLE MEASUREMENT DEVICE, SAMPLE MEASUREMENT METHOD, AND SAMPLE MEASUREMENT PROGRAM

(71) Applicant: PHC Holdings Corporation, Tokyo (JP)

(72) Inventors: Seiitirou Iketani, Ehime (JP); Sumitaka Fujita, Saitama (JP); Satoshi Fukumoto, Ehime (JP)

(73) Assignee: PHC Holdings Corporation, Tokyo (JP)

(*) Notice: Subject to any disclaimer, the term of this patent is extended or adjusted under 35 U.S.C. 154(b) by 216 days.

(21) Appl. No.: 18/749,209

(22) Filed: Jun. 20, 2024

(65) Prior Publication Data

US 2024/0337620 A1 Oct. 10, 2024

Related U.S. Application Data

(63) Continuation of application No. PCT/JP2022/046633, filed on Dec. 19, 2022.

(30) Foreign Application Priority Data

Jan. 27, 2022 (JP) ................................ 2022-010830

(51) Int. Cl.
*G01N 27/38* (2006.01)
*G01N 27/30* (2006.01)
*G01N 27/327* (2006.01)

(52) U.S. Cl.
CPC ....... *G01N 27/3274* (2013.01); *G01N 27/301* (2013.01); *G01N 27/308* (2013.01); *G01N 27/38* (2013.01)

(58) Field of Classification Search
CPC ............. G01N 27/3274; G01N 27/301; G01N 27/308; G01N 27/38; G01N 27/416; G01N 27/4163; G01N 33/4836
See application file for complete search history.

(56) References Cited

U.S. PATENT DOCUMENTS 4,615,866 A * 10/1986 Hyde .................. G01N 35/025 422/106
5,876,577 A * 3/1999 McAleer ............. G01N 27/404 205/785.5

(Continued)

FOREIGN PATENT DOCUMENTS

EP 2030561 A1 3/2009
JP 10276762 A * 10/1998 ............. C12M 1/34

(Continued)

OTHER PUBLICATIONS

EPO machine-generated English language translation of Amano et al. JP 10276762 A, patent published Oct. 20, 1998 (Year: 1998).*

(Continued)

*Primary Examiner* — Alexander S Noguerola
(74) *Attorney, Agent, or Firm* — RIMON P.C.

(57) ABSTRACT

A cell culture analysis device comprises a voltage application unit, a current measurement unit, a voltage measurement unit, and an analysis unit. The voltage application unit applies voltage to a sensing unit, which includes a working electrode, a counter electrode, and a reference electrode, of a sensor in a state in which the sensing unit is immersed in the culture medium. The current measurement unit measures the current flowing through the sensor from the voltage applied to the sensing unit. The analysis unit calculates the concentration of glucose or the like contained in a culture medium based on the measurement result. The voltage measurement unit measures the terminal voltage of the counter electrode in a state in which the voltage application unit is applying voltage. The analysis unit detects a measurement error based on the terminal voltage of the counter electrode.

14 Claims, 14 Drawing Sheets

(56) References Cited

U.S. PATENT DOCUMENTS

| | | | | |
|---|---|---|---|---|
| 6,144,871 | A | 11/2000 | Saito et al. | |
| 7,638,321 | B2 | 12/2009 | Teich et al. | |
| 8,594,760 | B2 | 11/2013 | Wieder et al. | |
| 10,106,847 | B1 * | 10/2018 | Brown | G01N 27/48 |
| 2008/0197023 | A1 * | 8/2008 | Miyahara | G01N 15/1031 204/403.01 |
| 2009/0000947 | A1 | 1/2009 | Akahori et al. | |
| 2009/0057148 | A1 * | 3/2009 | Wieder | A61B 5/14532 205/792 |
| 2014/0186876 | A1 | 7/2014 | Teich et al. | |
| 2014/0246336 | A1 | 9/2014 | Ooe et al. | |
| 2016/0077083 | A1 | 3/2016 | Teich et al. | |
| 2016/0252473 | A1 | 9/2016 | Yang et al. | |
| 2019/0271693 | A1 * | 9/2019 | Lakshmana | C12Q 1/68 |

FOREIGN PATENT DOCUMENTS

| | | | |
|---|---|---|---|
| JP | 11-281609 | A | 10/1999 |
| JP | 2001-066275 | A | 3/2001 |
| JP | 2001-174436 | A | 6/2001 |
| JP | 2009-056311 | A | 3/2009 |
| JP | 2011-013072 | A | 1/2011 |
| JP | 2011-099717 | A | 5/2011 |
| JP | 2016-197109 | A | 11/2016 |
| JP | 2021-101643 | A | 7/2021 |
| JP | 2021-185850 | A | 12/2021 |
| WO | 2006/132250 | A1 | 12/2006 |
| WO | 2013/073074 | A1 | 5/2013 |
| WO | 2013/184416 | A1 | 12/2013 |

OTHER PUBLICATIONS

EPO machine-generated English language translation of Saito et al. JP 2001066275 , patent published Mar. 16, 2001 (Year: 2001).*

EPO machine-generated English language translation of JP 2001-174436 A , patent published Jun. 29, 2001 (Year: 2001).*

EPO machine-generated English language translation of JP 2011-99717 A , patent published May 19, 2011 (Year: 2011).*

EPO machine-generated English language translation of JP 2021-101643 A , patent published Jul. 15, 2021 (Year: 2021).*

EPO machine-generated English language translation of JP 2021-185850 A , patent published Dec. 13, 2021 (Year: 2021).*

Extended European Search Report dated Jan. 22, 2025 issued in the corresponding European Patent Application No. 22924150.0.

International Search Report dated Feb. 21, 2023 issued in International Patent Application No. PCT/JP2022/046633, with English translation.

Japanese Office Action dated Feb. 4, 2025 issued in corresponding Japanese Patent Application No. 2023-576695, with English machine translation.

* cited by examiner

SAMPLE MEASUREMENT DEVICE, SAMPLE MEASUREMENT METHOD, AND SAMPLE MEASUREMENT PROGRAM

CROSS-REFERENCE OF RELATED APPLICATIONS

This application is a Continuation of International Patent Application No. PCT/JP2022/046633, filed on Dec. 19, 2022, which in turn claims the benefit of Japanese Patent Application No. 2022-010830, filed on Jan. 27, 2022, the entire disclosure of which Applications are incorporated by reference herein.

TECHNICAL FIELD

The present invention relates to a sample measurement device, sample measurement method, and sample measurement program for measuring a sample during cell culture, for example.

BACKGROUND ART

A conventional cell culture analysis device comprises a base, a sensor that is fixed in a through-hole portion provided to the base, and a lead wire that is connected to the sensor for taking off signals.

For example, Patent Literature 1 discloses a sensor that is immersed in a liquid cell culture medium and measures the cell culture environment within the medium.

Patent Literature 2 discloses a configuration comprising a lifting mechanism (elevator) for disposing a sensor in a culture medium.

Patent Literature 3 discloses a device and a method with which a sensor is immersed in a medium in a container, and cells contained in the medium are analyzed.

CITATION LIST

Patent Literature

Patent Literature 1: U.S. Unexamined Patent Application Publication No. 2014/0186876

Patent Literature 2: U.S. Unexamined Patent Application Publication No. 2016/0077083

Patent Literature 3: U.S. Pat. No. 7,638,321

Technical Problem

Solution to Problem

However, the conventional sensors, devices, and methods mentioned above have the following problem.

Cell culture is generally carried out by pouring a medium into a well plate including a plurality of recessed portions (wells), so there is sometimes variance in the amount of medium put into each well. Consequently, in performing cell culture with the sensor immersed in the medium, there is the risk that the worker may forget to add the medium, or that the part of the sensor including the measurement electrode may not be sufficiently immersed due to variance in the amount of medium, resulting in measurement error.

Also, since cell culture is performed in an environment of high-temperature and -humidity, there is the risk that mold or other such impurities (contamination) may adhere to the sensor and adversely affect the measurement result.

Accordingly, the conventional configuration described above did not take into account the possibility of improper sensor immersion or contamination by mold or the like, making it difficult to accurately detect the occurrence of measurement errors attributable to improper immersion of the sensor, contamination, or the like.

It is an object of the present invention to provide a sample measurement device, sample measurement method, and sample measurement program with which measurement errors attributable to improper sensor immersion, contamination, etc., can be detected in order to make accurate measurements.

The sample measurement device according to the present invention comprises a voltage application unit, a current measurement unit, a concentration measurement unit, a counter electrode terminal voltage measurement unit, and a measurement error detection unit. The voltage application unit applies voltage to the electrode unit of the sample measurement sensor to which voltage is applied in a state in which the electrode unit including at least a working electrode, a counter electrode, and a reference electrode is immersed in the sample. The current measurement unit measures the current flowing through the sample measurement sensor by the voltage applied to the electrode unit. The concentration measurement unit calculates the concentration of the analyte contained in the sample on the basis of the measurement result from the current measurement unit. The counter electrode terminal voltage measurement unit measures the terminal voltage of the counter electrode included in the electrode unit in a state in which voltage is applied by the voltage application unit. The measurement error detection unit detects a measurement error on the basis of the counter electrode terminal voltage measured by the counter electrode terminal voltage measurement unit.

Effects

With the sample measurement device according to the present invention, the occurrence of measurement errors attributable to improper sensor immersion, contamination, and the like can be detected in order to perform more accurate measurement.

DESCRIPTION OF THE EMBODIMENTS

A cell culture measurement device (sample measurement device) 1 according to an embodiment of the present invention will now be described through reference to FIGS. 1 to 14.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Overview of Cell Culture Analysis Device 1

The cell culture analysis device 1 of this embodiment electrochemically senses the concentration of a specific component (such as glucose or lactic acid) contained in a medium X in a state in which part of a sensor (sample measurement sensor) 30 has been immersed in a culture medium (liquid sample) held in a well plate 25 (see FIG. 5) including a plurality of wells (culture vessels), and analyzes the culture state (cell metabolism, etc.).

Figure 1:
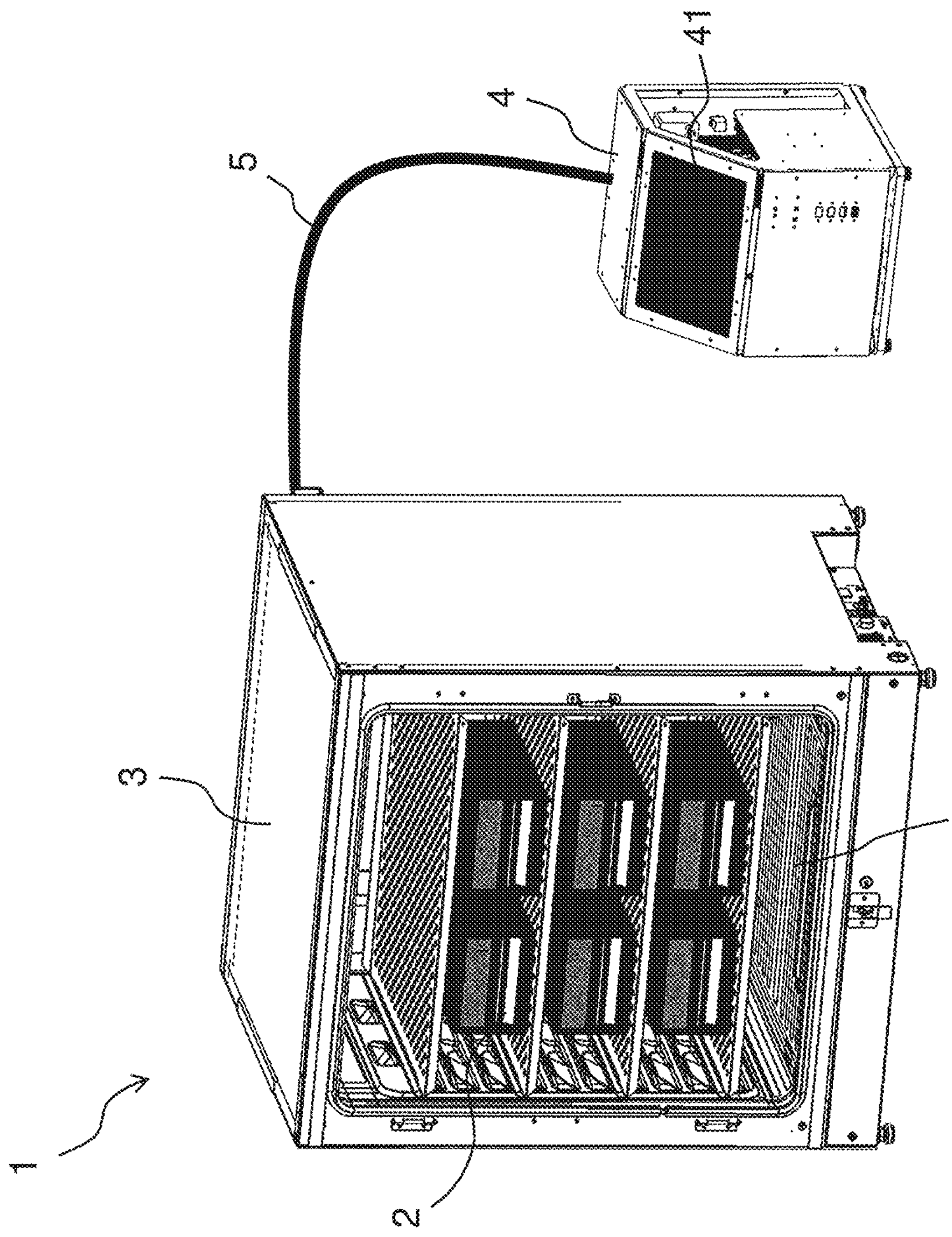
FIG. 1 is an overall view of a cell culture analysis device comprising the sensor unit according to an embodiment of the present invention.

As shown in FIG. 1, the cell culture analysis device 1 comprises an analysis unit 2, an incubator 3 in the interior space of which the analysis unit 2 is placed, and a control unit 4 that controls the analysis unit 2 and displays analysis results. Also, the analysis unit 2 and the control unit 4 are connected by an electrical cable 5.

A transparent door 3*a* attached to the front of the incubator 3 is opened, and the analysis unit 2 is placed in the internal space. The control unit 4 connected to the analysis unit 2 via the electrical cable 5 is disposed on the outside of the incubator 3.

This allows the user to use the control unit 4 to analyze the culture state in the incubator 3 without opening or closing the door 3*a* of the incubator 3, and thereby prevents contamination of the air in the incubator 3.

The analysis unit 2 is designed to be short in the lateral (width) direction, short in the height direction, and long in the depth direction so that a plurality of analysis units 2 can be installed in the incubator 3.

Figure 2:
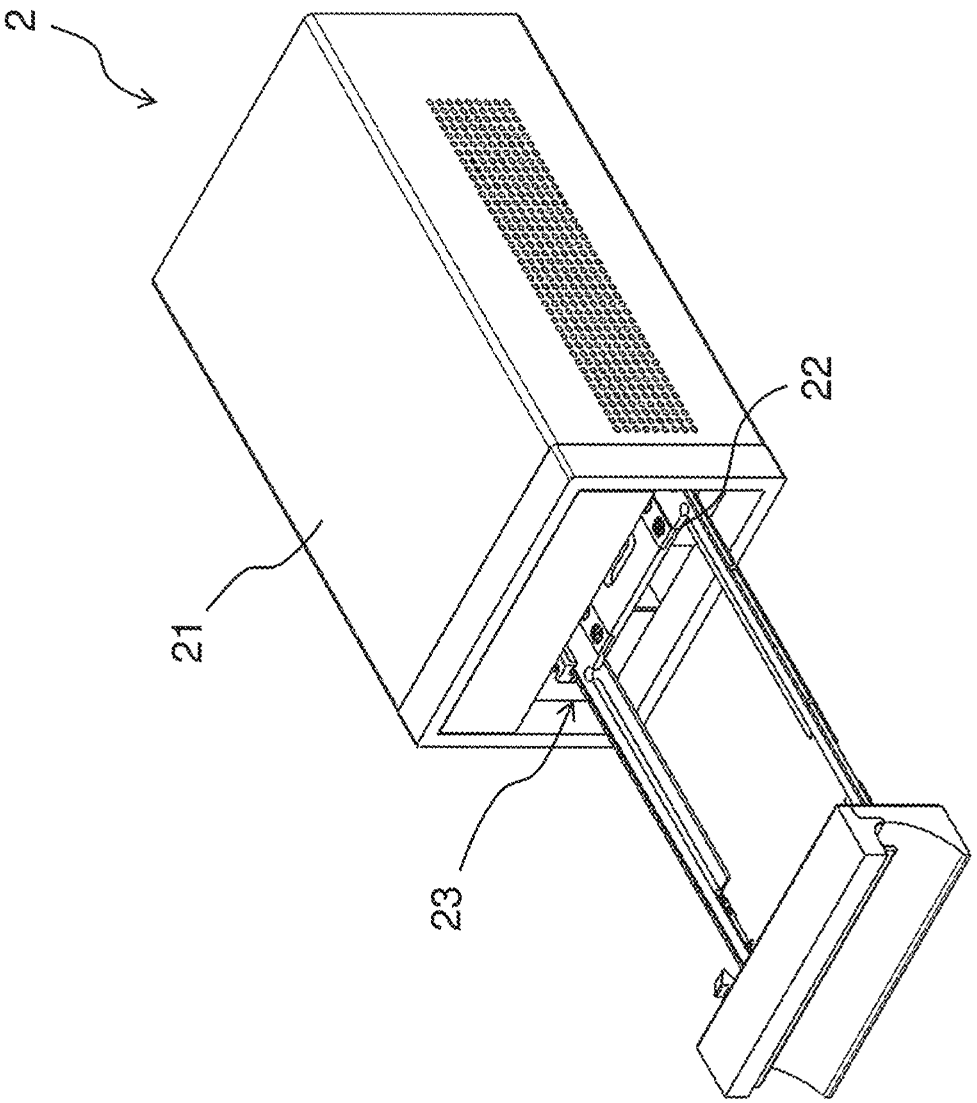
FIG. 2 is an oblique view of the configuration of an analysis unit included in the cell culture analysis device in FIG. 1.
Figure 3:
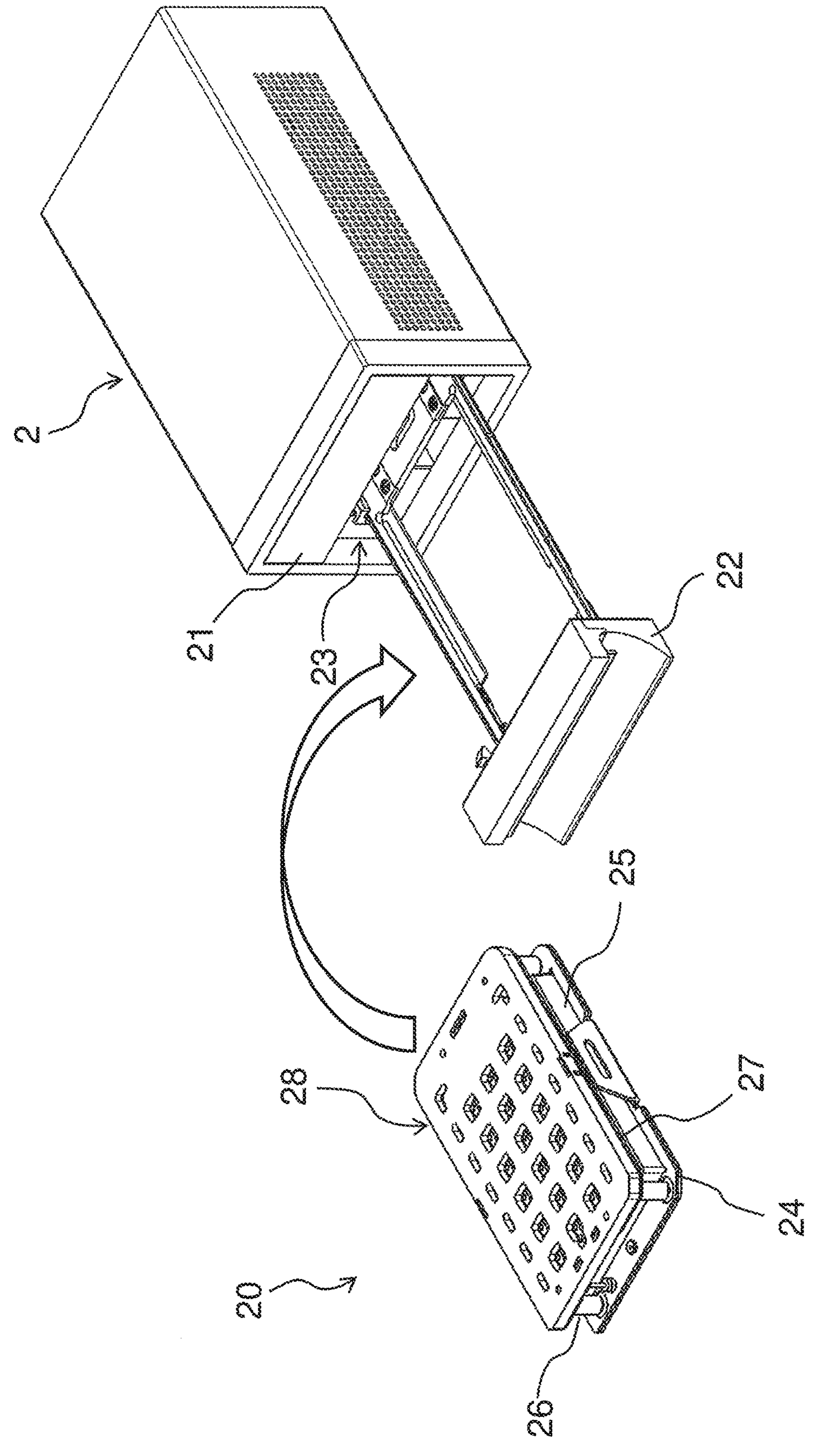
FIG. 3 is an oblique view of a state in which a culture module equipped with a sensor is placed in the analysis unit of FIG. 2.

As shown in FIGS. 2 and 3, the analysis unit 2 comprises a sensor-equipped culture module 20, a main body 21, a pull-out part 22, and a lifting mechanism 23.

Also, as shown in FIG. 1, the analysis unit 2 is disposed in the incubator 3 in advance, and is connected to the control unit 4 by the electrical cable 5. Then, during cell culture analysis, the assembled sensor-equipped culture module 20 is placed by the user in the main body 21 inside the incubator 3, as shown in FIG. 3.

The analysis unit 2 is configured to be lifted toward a probe holder (not shown) by an lifting mechanism 23 in a state in which the sensor-equipped culture module 20 has been pulled into the main body 21 by the pull-out part 22.

The detailed configuration of the analysis unit 2 will be described in detail below.

Figure 4:
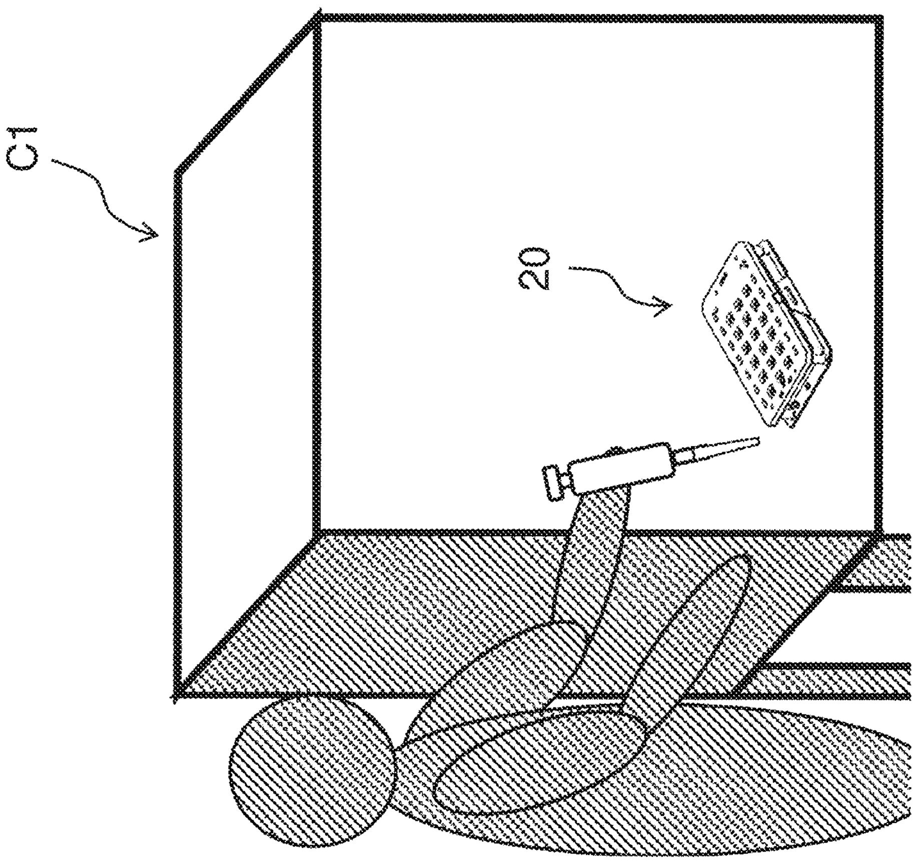
FIG. 4 is a schematic diagram showing processing on the sensor-equipped culture module in a biological safety cabinet in a room temperature environment.
Figure 5:
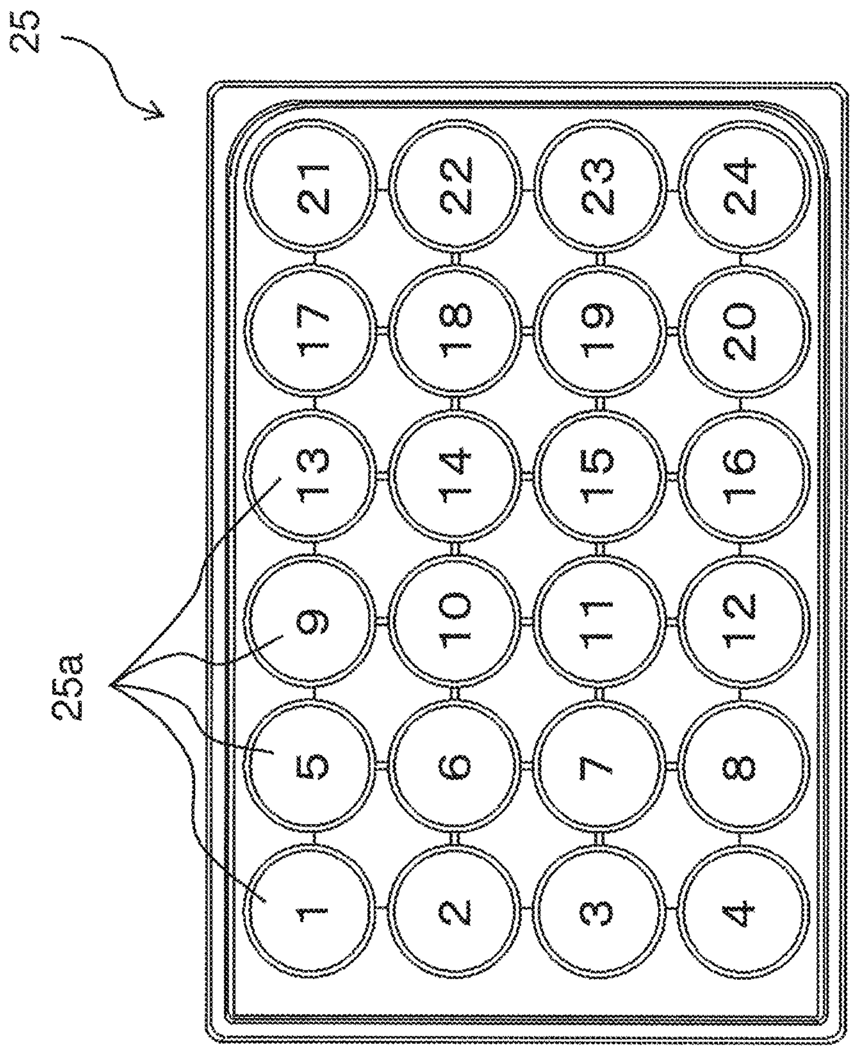
FIG. 5 is a top view showing a well plate including a plurality of wells in which the lower ends of the sensors included in the sensor-equipped culture module of FIG. 4 are immersed.

As shown in FIG. 4, the sensor-equipped culture module 20 is assembled after the wells 25*a* of the well plate 25 shown in FIG. 5 have been filled with the medium X (see FIG. 7) and cells have been seeded, inside a biological safety cabinet C1 under a room-temperature environment (such as an air temperature of 25 degrees). The assembled sensor-equipped culture module 20 is placed in the analysis unit 2 inside the incubator 3, which is maintained at a high-temperature and -humidity environment (37 degrees, humidity of 90% or higher). That is, the assembled sensor-equipped culture module 20 is moved from a room-temperature environment to a high-temperature and -humidity environment (such as a temperature of 37 degrees and a humidity of 90% or more).

The configuration for suppressing the occurrence of measurement errors, including contamination errors attributable to the adhesion of mold or other impurities to the sensor surface, and improper immersion errors in which the sensor 30 is not sufficiently immersed in the medium X, after the sensor-equipped culture module 20 is moved from a room-temperature environment to a high-temperature and -humidity environment, will be described in detail below.

Figure 6:
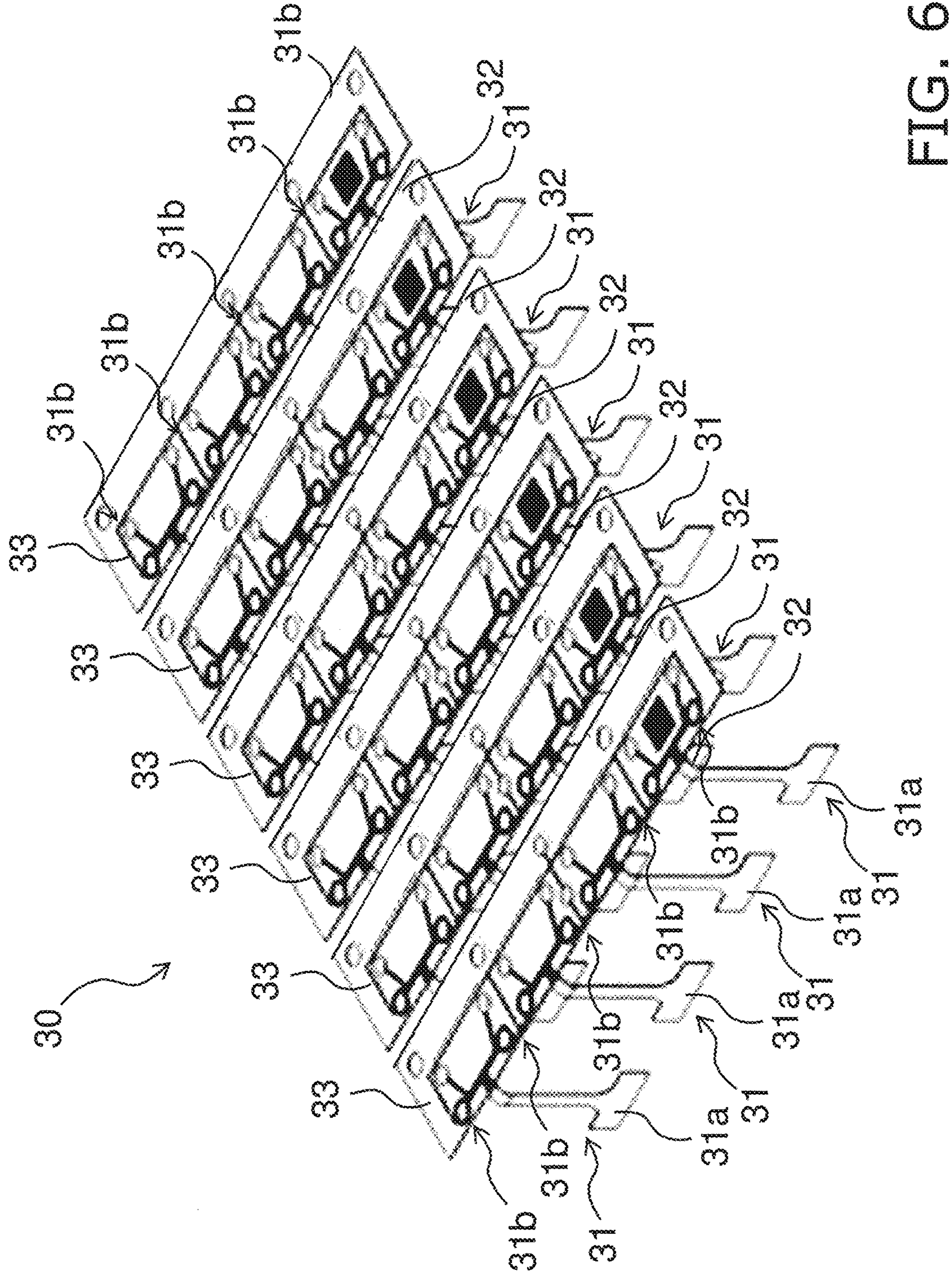
FIG. 6 is an oblique view of the plurality of sensors included in the sensor-equipped culture module in FIG. 4.

The sensor 30 is configured, for example, by forming a carbon electrode layer by sputtering on the upper surface of a PET (polyethylene terephthalate) film, which is a resin material. As shown in FIG. 6, the sensor 30 has a main body portion 31, a sensing unit (electrode unit) 31*a*, a connecting terminal portion 31*b*, a bent portion 32, and a linking portion 33.

The main body portion 31 is a substantially rectangular, flat member, and is linked at its upper end to the bent portion 32.

Figure 7:
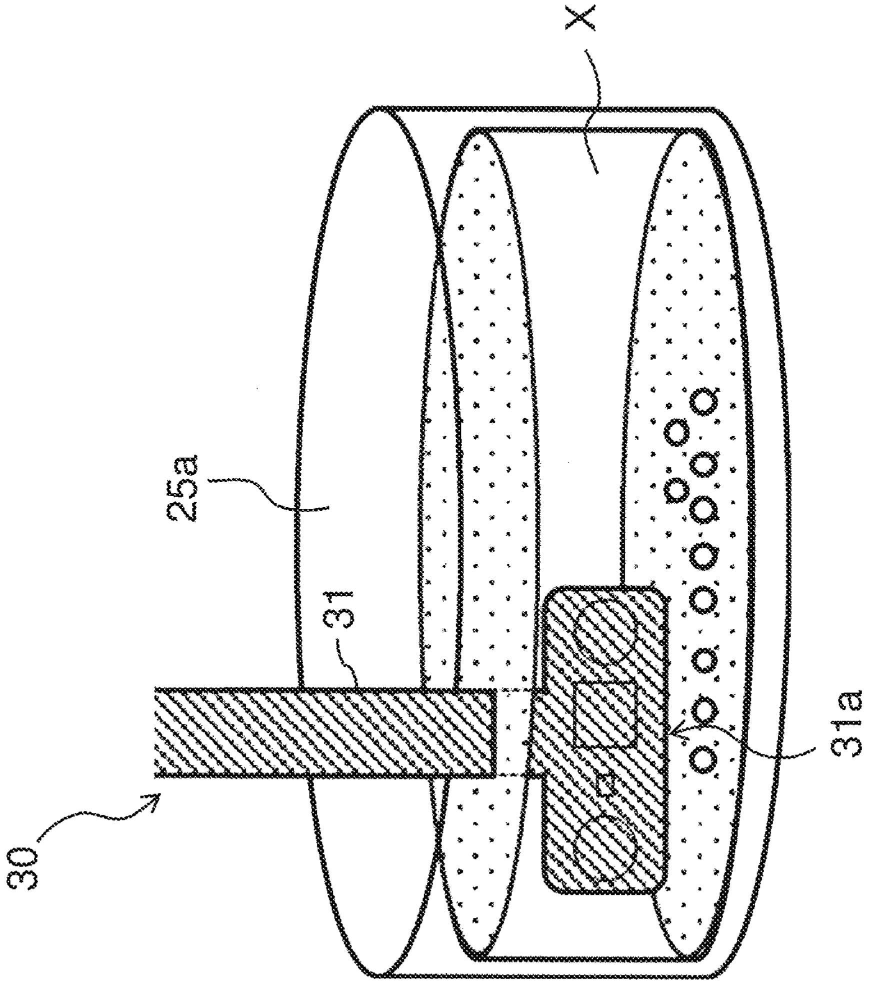
FIG. 7 is an oblique view of a state in which the lower end of a sensor in FIG. 6 is immersed in a medium in a well.
Figure 8:
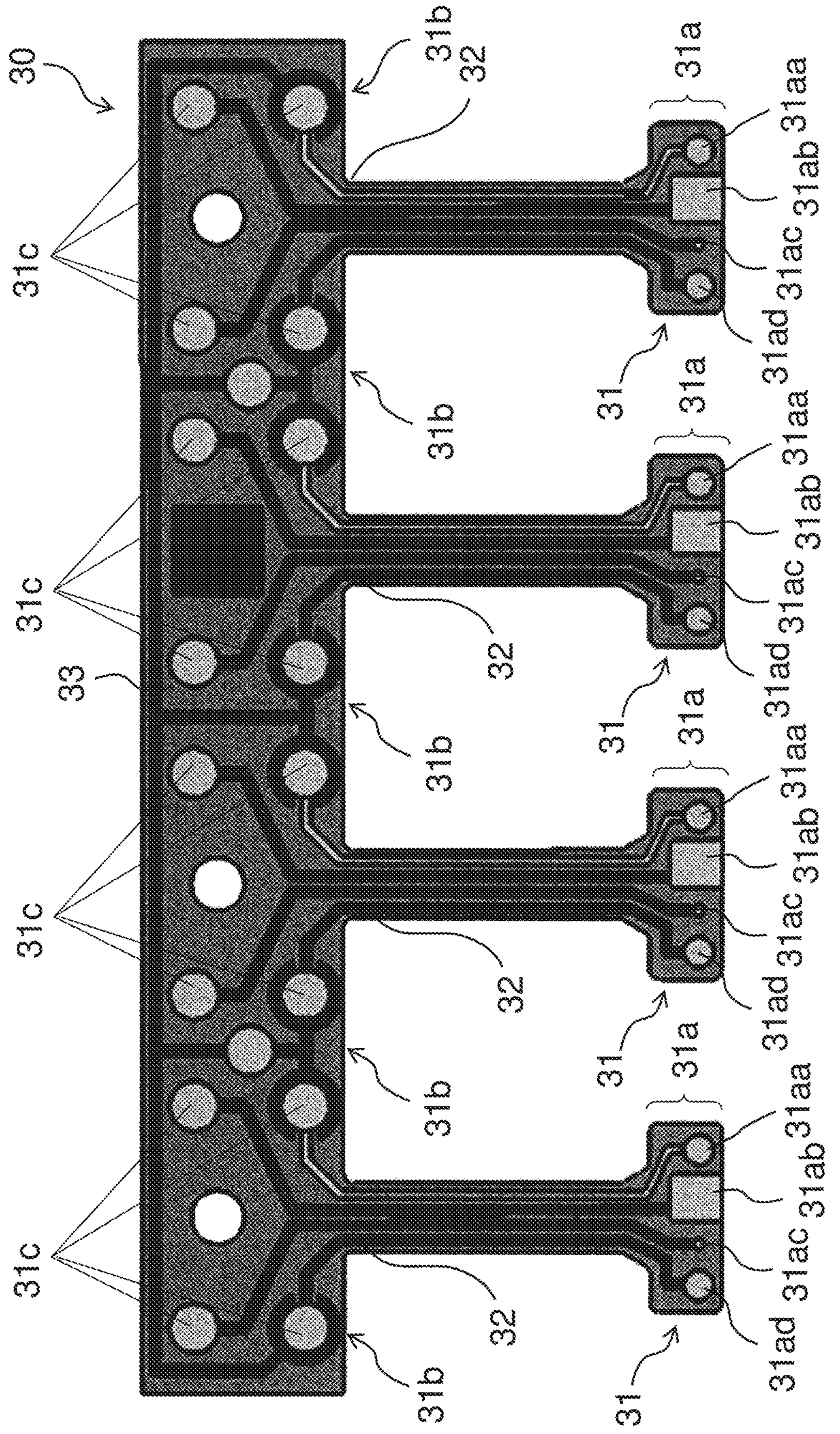
FIG. 8 is plan view of the configuration of the sensor shown in FIG. 6.
Figure 9:
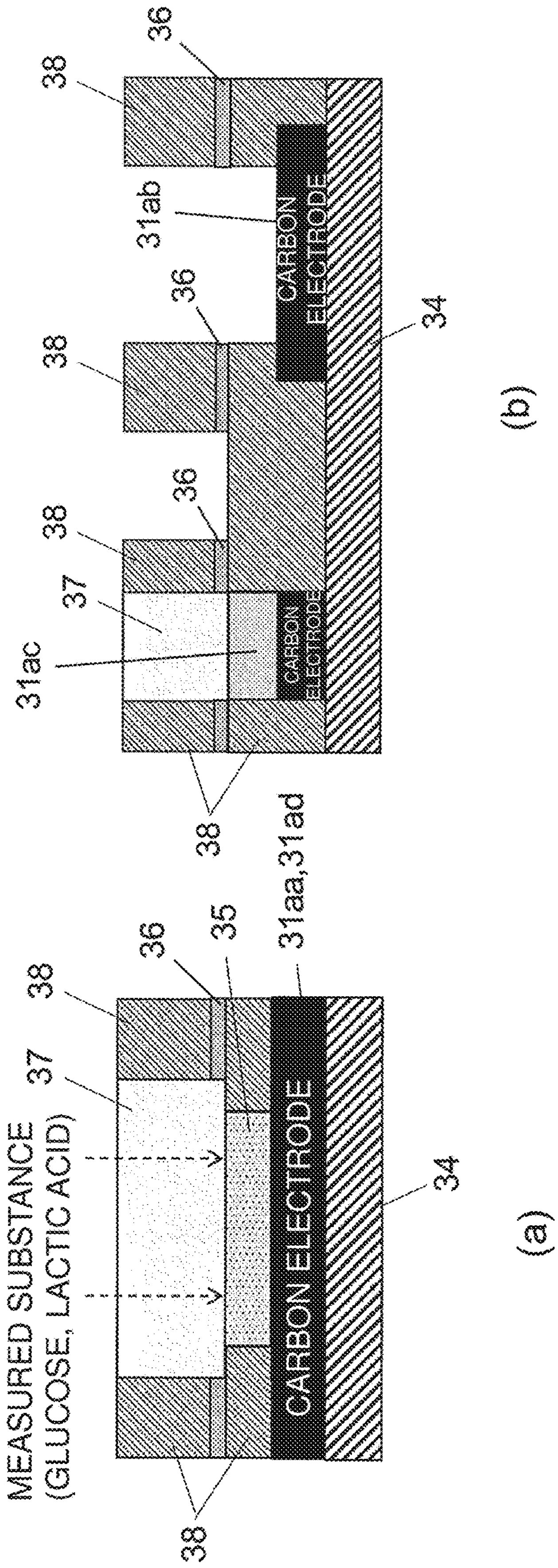
FIG. 9A is a cross-sectional view of the configuration of a working electrode unit included in the electrode unit of the sensor in FIG. 8.
FIG. 9B is a cross-sectional view of the configuration of a counter electrode and a reference electrode included in the electrode unit of the sensor in FIG. 8.

As shown in FIG. 7, the sensing unit (electrode unit) 31*a* is provided at the lower end of the main body portion 31, and a specific voltage is applied to each measurement electrode while immersed in the well 25*a* containing medium X, which allows the concentration of a specific component (such as glucose, or lactic acid) contained in medium X to be electrochemically measured. As shown in FIG. 8, the sensing unit 31*a* is provided on the surface of the wide part of the lower end of the downwardly facing T-shaped main body portion 31, and includes measurement electrodes (working electrodes 31*aa* and 31*ad*, counter electrode 31*ab*, reference electrode 31*ac*).

The measurement electrodes included in the sensing unit 31*a* are formed by transpiring the electrode layer with a laser and dividing the electrode layer. An electrode pattern may be formed by screen printing on each measurement electrode in order to improve the insulation between the wiring.

Here, when measuring the concentration of glucose contained in the medium X, for example, the reagent layer immobilized on the surface of the working electrodes may contain a glucose oxidase, such as glucose oxidase (GOx), glucose dehydrogenase (GDH), or even a redox mediator.

The concentration of glucose is measured by allowing the glucose that has permeated from the medium X through a protective film to react with the enzyme in the reagent layer (such as Gox or GDH) and be oxidized into gluconolactone, and converting the reduced product of a redox mediator produced at the same time, or the electrons generated by the oxidation reaction of hydrogen peroxide, into a current value.

As shown in FIG. 6, the bent portion 32 is a portion that links the main body portion 31 and the linking portion 33, and is bent approximately at a right angle along a specific bending line. Consequently, the linking portion 33 is disposed substantially perpendicular to the main body portion 31.

As shown in FIGS. 6 and 8, the linking portion 33 links the upper ends of the main body portions 31 of the four sensors 30 disposed in the lateral direction to each other via the bent portions 32.

As shown in FIG. 8, the connection terminal portions 31*b* are connected to the four electrodes 31*c* disposed corresponding to the measurement electrodes of the sensing unit 31*a* of one sensor 30, which is a set of four.

Of the four measurement electrodes included in the sensing unit 31*a*, the working electrode 31*aa* is disposed at the left end of the main body portion 31 of the sensor 30, and includes a reagent layer 35 coated with a reagent for measuring lactic acid. Also, as shown in FIG. 9A, the working electrode 31*aa* is provided as an electrode that is formed on the upper surface of a base material 34. The reagent layer 35 is provided on the upper surface of the portion of the working electrode 31*aa* that is used as an electrode. An insulating layer 38 is provided around the reagent layer 35 so as to surround the reagent layer 35. Furthermore, a protective film 37 that allows the object to be measured (lactic acid) to pass through is provided on the upper surface of the reagent layer 35. In addition, an insulating layer 38 is provided on the upper surface of the insulating layer 38 with an adhesive layer 36 interposed therebetween.

Consequently, since the reagent layer 35 is provided on the upper surface of the working electrode 31*aa*, the lactic acid that has permeated through the protective film 37 reacts with the reagent in the reagent layer 35, which causes the current value measured at the working electrode 31*aa* to change. This allows a change in the concentration of lactic acid contained in the medium X to be detected by detecting a change in this current value.

The counter electrode 31*ab* is disposed between the working electrode 31*aa* and the reference electrode 31*ac* in the main body portion 31 of the sensor 30. Also, as shown in FIG. 9B, the counter electrode 31*ab* is provided in an exposed state, without the reagent layer or the protective film being provided, so that its surface is in direct contact with the medium X.

Consequently, in measuring the counter electrode terminal voltage (discussed below), if there are impurities (contamination) such as mold that cover the surface of the counter electrode 31*ab*, for example, a contamination error can be detected very accurately by detecting with high sensitivity any change in the counter electrode voltage that occurs as a result of a reduction in the surface area of the counter electrode 31*ab*.

Also, the electrode portion of the counter electrode 31*ab* is formed from carbon. Since this carbon is more textured and porous than an electrode made of gold or the like, mold easily adheres to the surface of the counter electrode 31*ab*, making it more likely that the reaction surface area of the electrode will decrease and the occurrence of contamination will be detected.

As shown in FIG. 8, the reference electrode 31*ac* is disposed between the counter electrode 31*ab* and the working electrode 31*ad* in the main body portion 31 of the sensor 30. The reference electrode 31*ac* is formed from silver chloride, and its surface is covered with the protective film 37 as shown in FIG. 9B.

The working electrode 31*ad* is disposed at the right end of the main body portion 31 of the sensor 30, and includes the reagent layer 35 coated with a reagent for measuring glucose. Also, as shown in FIG. 9A, the working electrode 31*ad* is provided as an electrode that is formed on the upper surface of the base material 34, similarly to the working electrode 31*aa*. The reagent layer 35 is provided on the upper surface of the portion of the working electrode 31*ad* that is used as an electrode. The insulating layer 38 is provided around the reagent layer 35 so as to surround the reagent layer 35. Furthermore, the protective film 37 that allows the object to be measured (glucose) to pass through is provided on the upper surface of the reagent layer 35. Another insulating layer 38 is provided on the upper surface of the insulating layer 38 with an adhesive layer 36 interposed therebetween.

Consequently, since the reagent layer 35 is provided on the upper surface of the working electrode 31*ad*, the glucose that has permeated through the protective film 37 reacts with the reagent in the reagent layer 35, resulting in a change in the current value measured at the working electrode 31*ad*. This allows a change in the concentration of glucose contained in the medium X to be detected by detecting the change in this current value.

The protective film 37 is provided to prevent silver chloride or the like provided on the reagent layer 35 and the reference electrode 31*ac* containing reagents that are toxic to the cells being cultured from eluting into the medium X. Also, providing the protective film 37 makes possible long-term measurement, such as for 14 days, by suppressing the permeability of the analyte (glucose and lactic acid) and limiting the reactivity of the reagent contained in the reagent layer 35.

Here, the working electrodes 31*aa* and 31*ad* are formed so as to be exposed through an opening that is substantially circular in plan view. This allows the protective film 37 provided on the upper surfaces of the working electrodes 31*aa* and 31*ad* to be applied substantially evenly.

On the other hand, as discussed above, the counter electrode 31*ab* is not provided with a reagent layer or a protective film, so it is formed to be discharged from a substantially rectangular opening so that the surface area in contact with the medium X will be as large as possible. This improves the sensitivity at which the counter electrode terminal voltage is measured when a measurement error is detected (discussed below).

The four electrodes 31*c* are provided to the upper part of the sensor 30 as contacts that are electrically connected to the cell culture analysis device 1 (probe holder (not shown)). The electrodes 31*c* are electrically connected to the measurement electrodes (working electrodes 31*aa*, 31*ad*, counter electrode 31*ab*, reference electrode 31*ac*) included in the sensing unit 31*a* disposed at the lower part of the main body portion 31 of the sensor 30.

In this embodiment, as shown in FIG. 6, the plurality of sensors 30 included in the sensor unit 28 each comprise the main body portion 31, the sensing unit 31*a* that is disposed on the lower end side of the main body portion 31, is immersed in the medium X, and measures the components of the medium X, and the linking portion 33 that links the plurality of sensors 30 on the upper end side of the main body portion 31.

Consequently, since the sensors 30 are attached to the upper surface of the bottom plate 27 in a state of being linked together by the linking portions 33, the positions of the linked sensors 30 can be accurately defined.

This improves the positional accuracy (position, angle, etc.) of each sensor 30 with respect to the plurality of wells (culture vessels) 25*a* included in the well plate 25.

As a result, the immersion depth of each sensor 30 in the medium X placed in a well 25*a* becomes substantially constant, which allows stable measurement results to be obtained.

Meanwhile, although the positional accuracy of each sensor 30 with respect to the well 15*a* is improved, the well plate 25 includes a plurality of (24 in this embodiment) wells 25*a*. Accordingly, it is difficult to accurately pour the specified amount of medium X into each well 25*a*, and there is the risk that errors such as forgetting to add the medium X, or pouring in the wrong amount may occur. Consequently, there is the risk that there will be variance in the amount of medium X put into each well 25*a*, and when the sensing unit 31*a* of the sensor 30 is immersed in the medium X in the well 25*a*, that an improper immersion error may occur in which there is not enough medium X and the sensing unit 31*a* is not sufficiently immersed.

Furthermore, since the environment in which cell culture is performed is a high-temperature and -humidity environment as mentioned above, mold or other such impurities (contaminants) are more apt to be a problem during cell culture. For example, if mold or other such impurities (contaminants) adhere to and grow on the surface of the sensor 30 while the sensor is immersed in the medium X, there is the risk of adversely affecting the measurement result for the measurement target (glucose, lactic acid).

Figure 10:
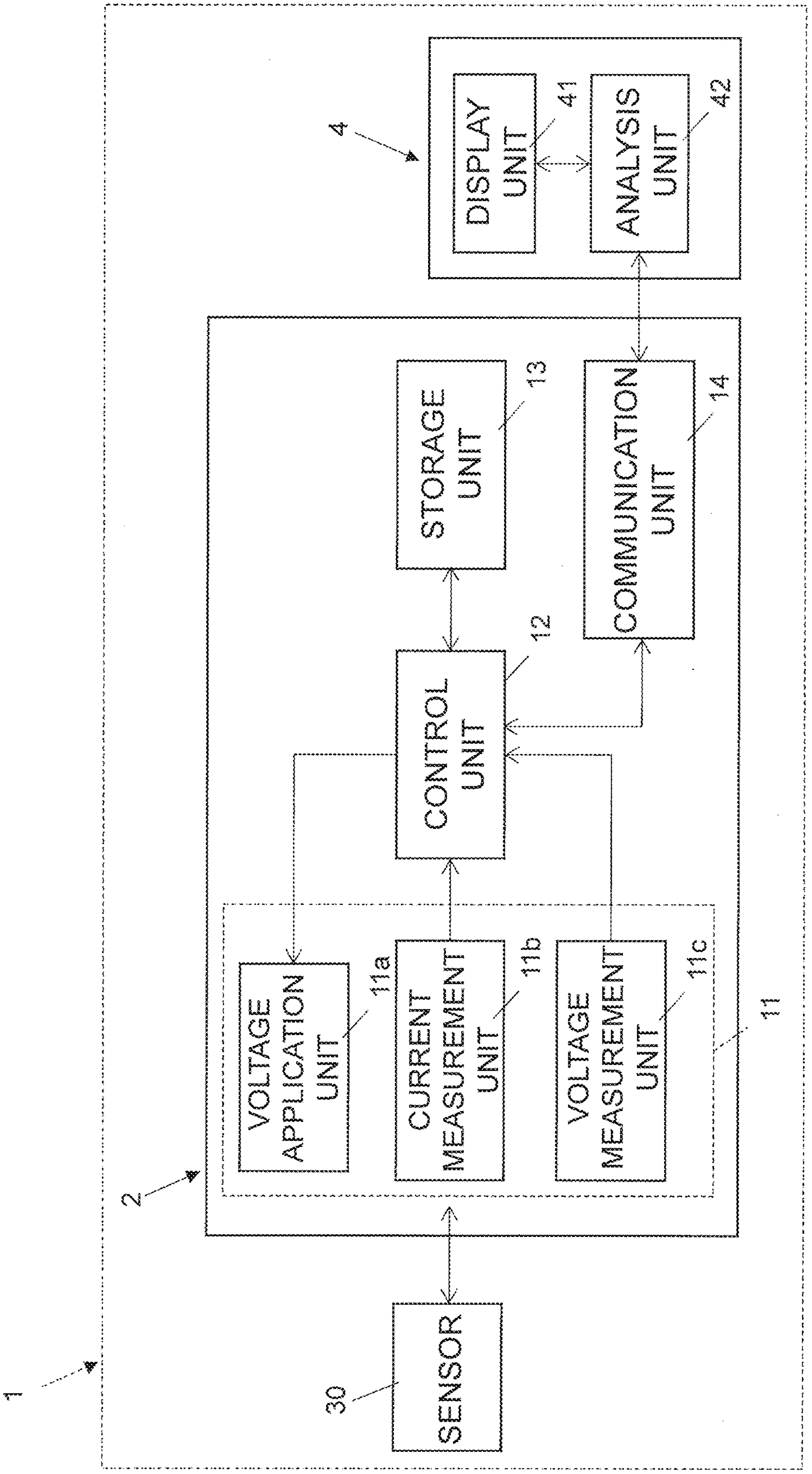
FIG. 10 is a control block diagram of the cell culture analysis device in FIG. 1.

With the cell culture analysis device 1 of this embodiment, in order to detect the occurrence of such measurement errors (improper immersion error, contamination error) with high accuracy, the analysis unit 2 comprises an electrochemical measurement unit 11, a control unit 12, a storage unit 13, and a communication unit 14 as shown in FIG. 10.

The electrochemical measurement unit 11 is a potentiostat that measures the concentration of a measurement target by applying a specific voltage to the electrodes of a sensor 30 having a three-electrode configuration, and as shown in FIG. 10, has a voltage application unit 11*a*, a current measurement unit 11*b*, and a voltage measurement unit (counter electrode terminal voltage measurement unit) 11*c*.

The voltage application unit 11*a* applies a specific voltage for measuring the concentration of glucose and lactic acid contained in the medium X to the sensor 30 having the three-electrode configuration mentioned above.

The current measurement unit 11*b* detects a change in the value of the current flowing through the sensor 30, which is measured by applying a voltage to the electrodes of the sensor 30 from the voltage application unit 11*a*. This allows the concentration of lactic acid to be measured according to the change in the value of the current flowing through the working electrode 31*aa*, and the concentration of glucose to be measured according to the change in the value of the current flowing through the working electrode 31*ad* (see FIG. 11).

The voltage measurement unit 11*c* measures the terminal voltage of the counter electrode 31*ab* of the sensor 30 in order to detect the occurrence of a measurement error (improper immersion error, contamination error). The result measured by the voltage measurement unit 11*c* is transmitted to the control unit 4 via the communication unit 14.

As shown in FIG. 10, the control unit 12 is connected to the voltage application unit 11*a*, the current measurement unit 11*b*, the voltage measurement unit 11*c*, the storage unit 13, and the communication unit 14. The control unit 12 controls the voltage application unit 11*a* so that a specific voltage will be applied to the sensor 30, and controls the communication unit 14 so that the measurement results from the current measurement unit 11*b* and the voltage measurement unit 11*c* will be transmitted to the control unit 4.

As shown in FIG. 10, the storage unit 13 is connected to the control unit 12, and stores data such as the preset value of the applied voltage for each measurement target, or the measurement results from the current measurement unit 11*b* and the voltage measurement unit 11*c*, for example.

As shown in FIG. 10, the communication unit 14 is controlled by the control unit 12 and transmits data such as the measurement results from the current measurement unit 11*b* and the voltage measurement unit 11*c* to an analysis unit 42 of the control unit 4.

As shown in FIG. 10, the control unit 4 is capable of communicating with the analysis unit 2 via the communication unit 14, and comprises a display unit 41 and an analysis unit 42.

The display unit 41 displays, as the result of analysis by the analysis unit 42, the change in the concentration of glucose and lactic acid based on the sensor current value measured by the current measurement unit 11*b*, the measurement error detection result based on the value of the counter electrode terminal voltage measured by the voltage measurement unit 11*c*, and so forth.

The analysis unit 42 is, for example, a PC (personal computer), and performs metabolic analysis of the cells during culture by measuring the concentrations of lactic acid and glucose (the measurement targets) on the basis of the change in the sensor current flowing through the working electrodes 31*aa* and 31*ad* as measured by the current measurement unit 11*b*. Also, the analysis unit 42 detects whether there is any measurement error (contamination error, improper immersion error; (discussed below)) on the basis of the change in the counter electrode terminal voltage measured by the voltage measurement unit 11*c*.

Measurement Error Detection

The cell culture analysis device 1 of this embodiment has the configuration described above, and measures the counter electrode terminal voltage with the voltage measurement unit 11*c* to detect any measurement errors, including contamination errors in which mold or another such impurity adheres to the sensor surface and reduces the accuracy of the measurement result, and improper immersion errors in which the sensor is not sufficiently immersed due to variance in the amount of medium X put into the wells 25*a* of the well plate 25.

Here, the principle by which measurement errors can be detected by measuring the counter electrode terminal voltage will be explained through reference to FIGS. 11, 12A, and 12B.

FIGS. 12A and 12B are graphs intended to facility an understanding of the behavior of the counter electrode terminal voltage, and in actual measurement, cell metabolism consumes glucose and produces lactic acid, so the glucose current value decreases over time, while the lactate current value increases.

Figure 11:
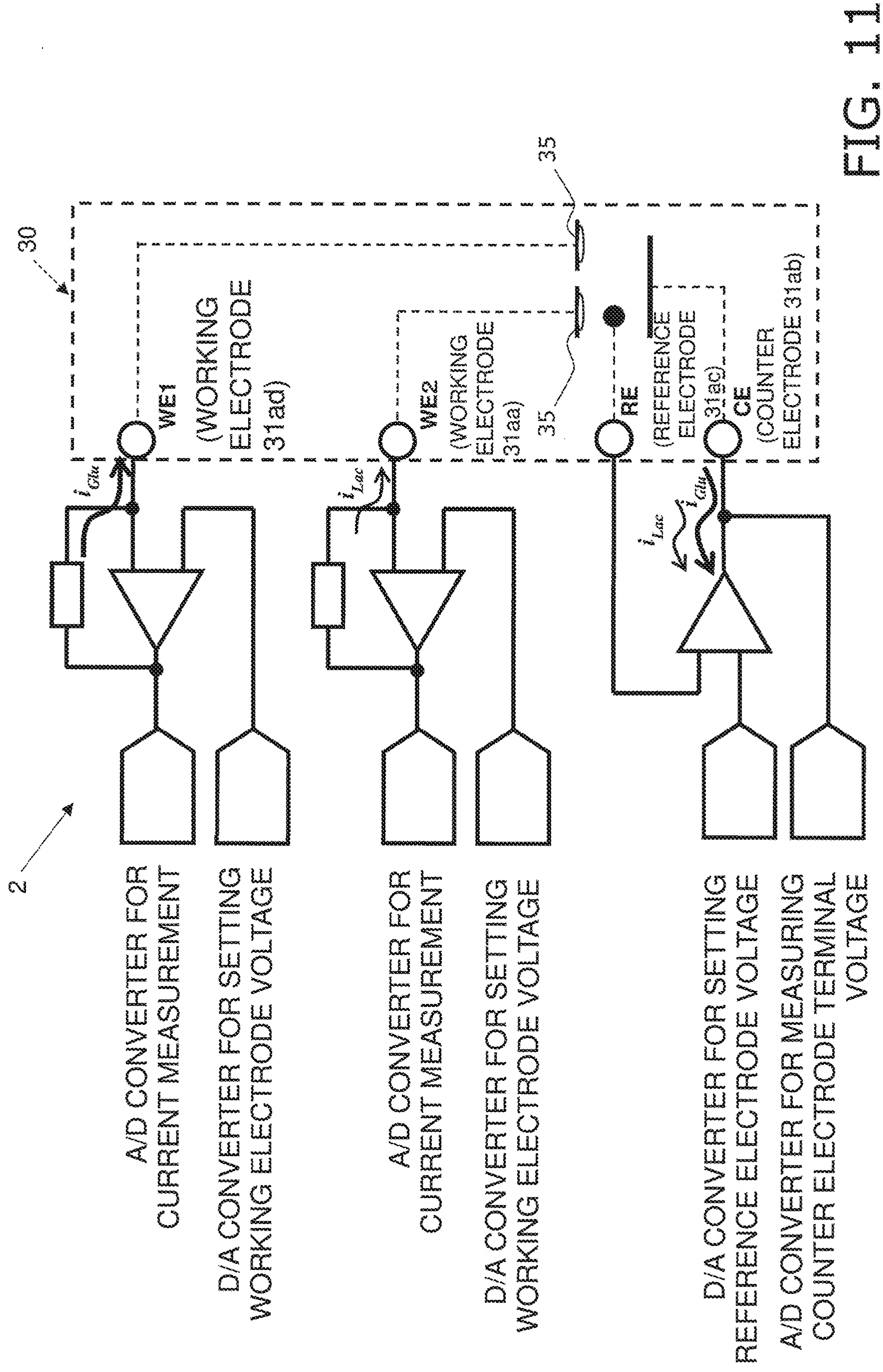
FIG. 11 is a diagram illustrating the behavior of the counter electrode in the circuit configuration of the measurement unit of the sensor shown in FIG. 8.
Figure 12:
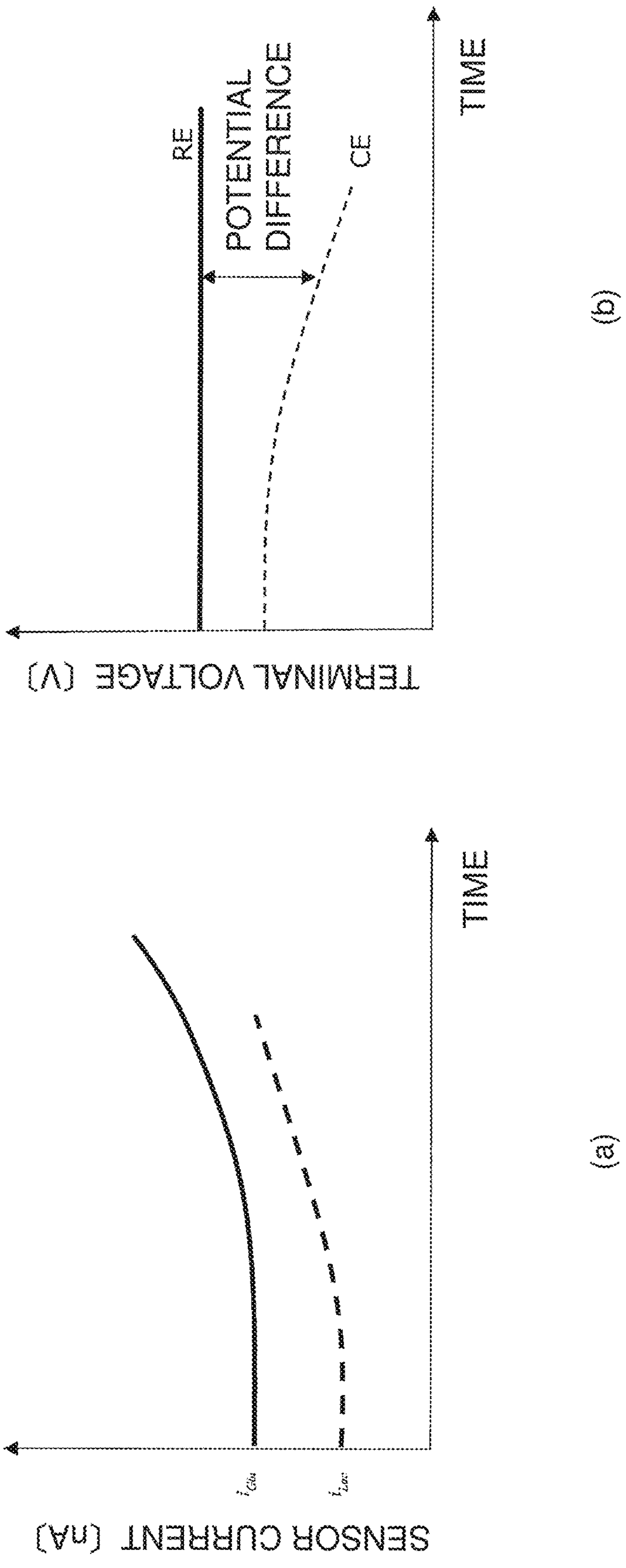
FIG. 12A is a graph of the relation between elapsed time and the sensor current value.
FIG. 12B is a graph of the relation between elapsed time and the terminal voltage of the counter electrode.
Figure 13:
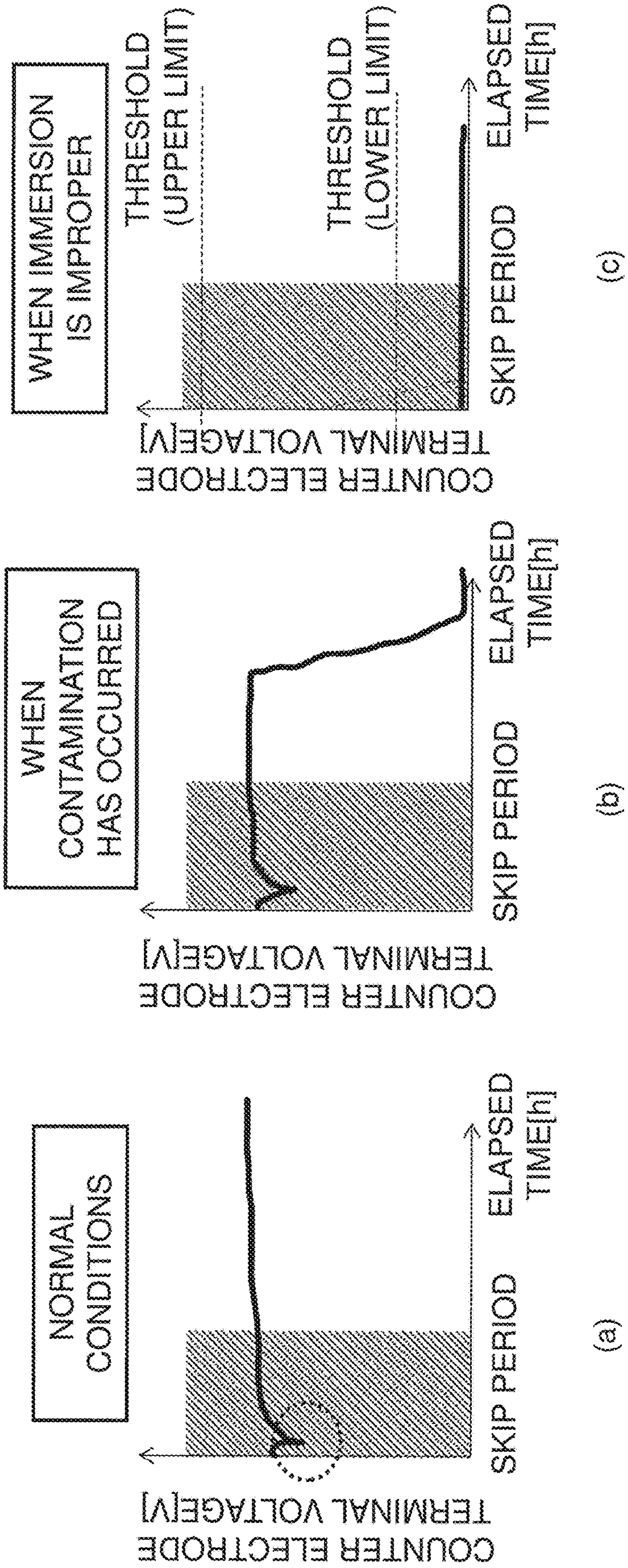
FIGS. 13A, 13B, and 13C are graphs of the relation between elapsed time and the counter electrode terminal voltage under normal conditions, when contamination has occurred, and when the immersion is improper.

When the circuit within the sensor 30 shown in FIG. 11 is operating normally, the currents $i_{Lac}$ and $i_{Glc}$ flowing through the counter electrode 31*ab* and the working electrodes 31*aa* and 31*ad* are equivalent. Then, as shown in FIG. 12A, when the currents $i_{Lac}$ and $i_{Glc}$ flowing through the working electrodes 31*aa* and 31*ad* increase, this changes the counter electrode terminal voltage in the direction in which the current on the counter electrode 31*ab* side increases.

In other words, a change in the counter electrode terminal voltage in the direction in which the current on the counter electrode 31*ab* side increases is equivalent to an increase in the reaction per unit of electrode surface area in the counter electrode 31*ab*. This means that the drive force of the counter electrode 31*ab* is greater, that is, as shown in FIG. 12B, the voltage difference (RE–CE) between the reference electrode 31*ac* and the counter electrode 31*ab* is greater.

Therefore, in terms of the circuit, as shown in FIG. 12B, the operational amplifier output (counter electrode terminal voltage) connected to the counter electrode 31*ab* changes in the negative direction. That is, as the sensor current rises, the counter electrode terminal voltage does down.

Consequently, when impurities such as mold are generated and proliferate on the surface of the sensor 30 installed in a high-temperature and -humidity environment, and particularly on the surface of the counter electrode 31*ab*, the counter electrode terminal voltage drops off sharply, for example.

Because of this, with the cell culture analysis device 1 of this embodiment, by measuring the counter electrode terminal voltage, contamination errors and improper immersion errors occurring in the sensor 30 are detected, which avoids measurement of the concentration of glucose concentration and lactic acid from being made in a state of diminished accuracy.

More specifically, with the cell culture analysis device 1 of this embodiment, as shown in FIG. 13A, the analysis unit 42 sets a skip period in which no measurement is performed for a specific length of time from the start of voltage application to the sensor 30.

This skip period is set because, for several hours immediately after the start of voltage application to the sensor 30, there is the risk that the counter electrode terminal voltage will rise change significantly depending on the state of the sensor 30 before voltage application, so there is the risk that there will be variance in the measurement result.

After the sensor 30 is immersed in the medium X, up until the point when the voltage is applied, the action of the mediator reagent causes the amount of reducing substances to increase. This creates a difference in the magnitude of the sensor current flowing immediately after voltage application depending on how long it takes from immersion of the sensor 30 until the application of voltage. That is, the longer is the time from immersion to voltage application, the larger is the amount of sensor current. Therefore, in terms of the circuit, in order to cause a large current equivalent to that of the working electrodes 31*aa* and 31*ad* to flow through the counter electrode 31*ab*, the terminal voltage of the counter electrode 31*ab* is controlled to decrease.

For this reason, the several hours immediately after the start of voltage application, in which the rate of fluctuation of the counter electrode terminal voltage is more likely to increase, is set as a skip period (dead zone).

The detection of a contamination error will now be described through reference to FIG. 13B.

As shown in FIG. 13B, when an impurity such as mold is generated and proliferates on the surface of the sensor 30 after the skip period has elapsed, the counter electrode terminal voltage drops off sharply midway through.

At this point, the counter electrode terminal voltage also decreases due to cell metabolism, but if there is contamination, this decrease will be even sharper than during cell metabolism (the negative rate of change is higher than during cell metabolism).

Consequently, the analysis unit 42 determines whether or not the negative rate of change in the counter electrode terminal voltage is below a specific threshold value, and if it is below the specific threshold value, it is determined that a contamination error has occurred, and the display unit 41 displays that a contamination error has occurred, which allows the user to be notified of the occurrence of an abnormality.

Next, the detection of an improper immersion error will be described through reference to FIG. 13C.

If the sensing unit 31*a* of the sensor 30 is sufficiently immersed in the medium X, the operational amplifier output connected to the counter electrode 31*ab* and the operational amplifier inverting input connected to the reference electrode 31*ac* are connected via the liquid, forming a closed loop. The operational amplifier output voltage connected to the counter electrode 31*ab* varies within a specific range so that "the voltage of the operational amplifier inverting input" connected to the reference electrode 31*ac* and "the voltage of the operational amplifier non-inverting input" connected to the DA converter used for setting the reference electrode voltage will be equal.

On the other hand, if an immersion error occurs in which the sensing unit 31*a* of the sensor 30 is not sufficiently immersed in the medium X, the operational amplifier output connected to the counter electrode 31*ab* and the operational amplifier inverting input connected to the reference electrode 31*ac* are not connected via the liquid, resulting in an open loop.

Therefore, the operational amplifier operates as a comparator, and the operational amplifier output voltage (counter electrode terminal voltage) connected to the counter electrode 31*ab* becomes either Low or High in the initial stage (during the skip period). That is, either the counter electrode terminal voltage bottoms out (drops almost to zero) or peaks out (roughly the maximum output voltage of the operational amplifier).

If there is no problem with the immersion state at the start of voltage application, it is unlikely that an immersion error will occur midway through cell culture in a high-temperature and -humidity environment. That is, as long as the specified amount of medium X has been poured into the well 25*a*, there will be no immersion error even if some of the medium X evaporates during cell culture.

Consequently, the analysis unit 42 determines whether or not the counter electrode terminal voltage has deviated from the specified range during the skip period, and if it has deviated from the specified range, it is determined that an immersion error has occurred, and the display unit 41 displays that an immersion error has occurred, thereby notifying the user of the occurrence of an abnormality.

Measurement Error Detection Method

As described above, with the cell culture analysis device 1 of this embodiment, the above-mentioned measurement errors (contamination errors and improper immersion errors) are detected by measuring the counter electrode terminal voltage related to the counter electrode 31*ab* of the three-electrode sensor 30.

Figure 14:
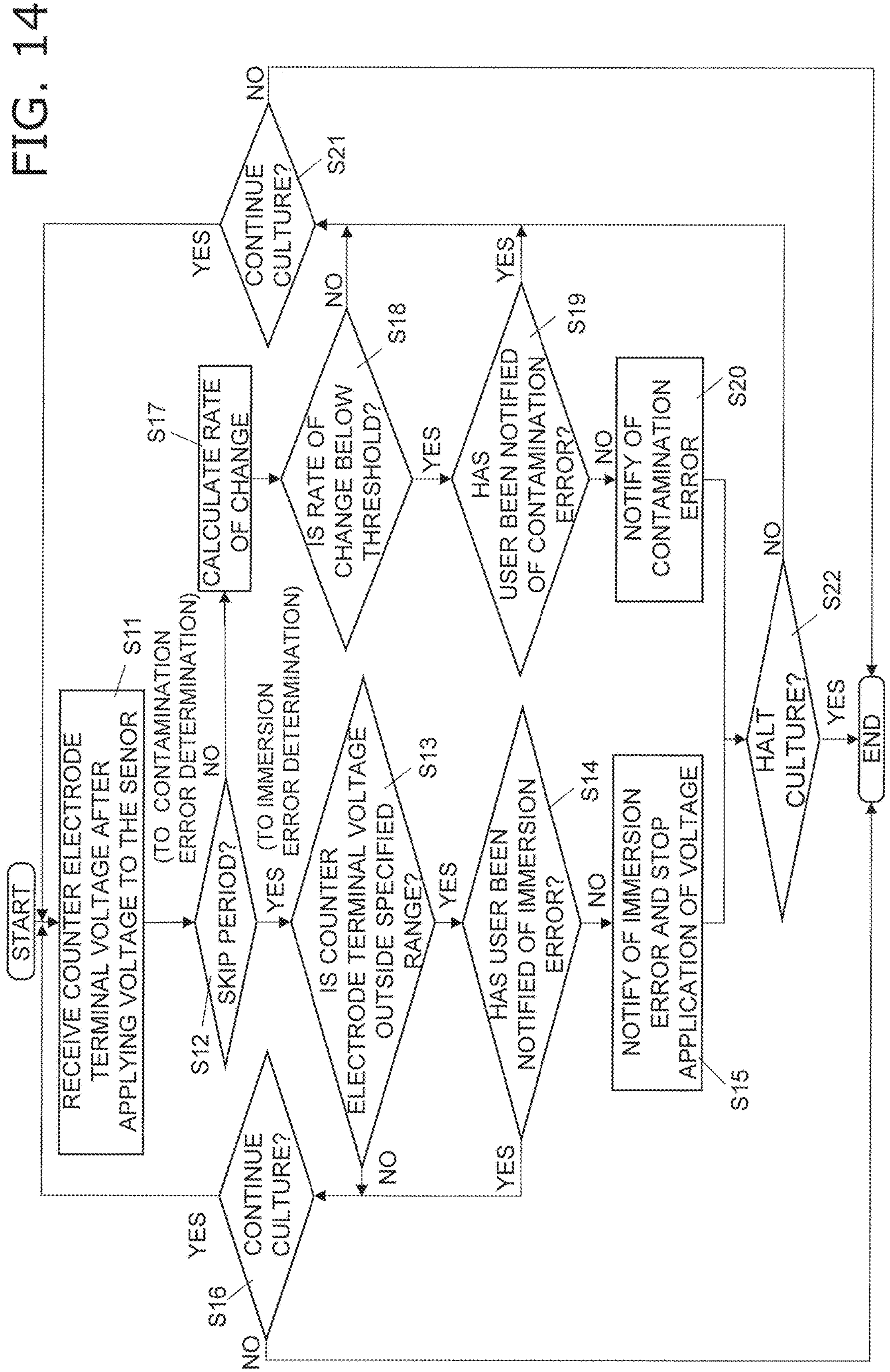
FIG. 14 is a flowchart showing the processing flow of a sample measurement method that makes use of the cell culture analysis device in FIG. 1.

Here, the flow of processing in a measurement error detection method will be described through reference to the flowchart in FIG. 14.

That is, in step S11, after the voltage application unit 11*a* included in the electrochemical measurement unit 11 of the analysis unit 2 has applied a specific voltage to the sensor 30, the analysis unit 42 receives the counter electrode terminal voltage of the counter electrode 31*ab* included in the sensor 30, from the voltage measurement unit 11*c* via the communication unit 14.

Next, in step S12, the analysis unit 42 determines whether or not the received counter electrode terminal voltage is a result measured within the skip period.

Here, if the measurement result was during the skip period, the processing proceeds to the immersion error determination processing from step S13 onward. On the other hand, if the measurement result was not during the skip period, and was instead a measurement result after the skip period had elapsed, the processing proceeds to the contamination error determination processing from step S17 onward.

Next, in step S13, since the received counter electrode terminal voltage was determined in step S12 to be a measurement result during the skip period, the analysis unit 42 determines whether or not the value of the counter electrode terminal voltage is outside the specified range in order to determine whether there is an immersion error.

Here, if the value of the counter electrode terminal voltage is outside the specified range, it is determined that an immersion error has occurred, and the processing proceeds to step S14. On the other hand, if the value of the counter electrode terminal voltage is within the specified range, it is determined that no immersion error has occurred, and the processing proceeds to step S16.

Next, in step S14, since it was determined in step S13 that the value of the counter electrode terminal voltage was outside the specified range, it is determined whether or not the user has been notified on the display unit 41 about the immersion error that appears to have occurred.

Here, if notification has been given, the processing proceeds to step S16, but if no notification has been given, the processing proceeds to step S15.

Next, in step S15, in order to notify of the occurrence of an immersion error that has not yet been reported, the display unit 41 displays a message to the effect that an immersion error has occurred. If the voltage is still being applied in a state in which the sensing unit 31*a* of the sensor 30 is not sufficiently immersed in the culture medium X, there is the risk that the sensor 30 will malfunction, so the control unit 12 halts the application of voltage from the voltage application unit 11*a* to the sensor 30, and the processing proceeds to step S22.

Next, in step S16, since it was determined in step S13 that the value of the counter electrode terminal voltage was within the specified range, or it was determined in step S14 that the occurrence of an immersion error had been reported, it is determined whether or not to continue the culture.

Here, if the user selects to continue the culture, the processing goes back to step S11 and measurement error determination processing is repeated. On the other hand, if the user chooses not to continue the culture, the processing is ended.

On the other hand, in step S17, since the received counter electrode terminal voltage was determined in step S12 to be a measurement result outside the skip period, the analysis unit 42 calculates the negative rate of change in the counter electrode terminal voltage over the elapsed time in order to determine whether or not there is a contamination error.

Next, in step S18, it is determined whether or not the negative rate of change in the counter electrode terminal voltage calculated in step S17 is below a specific threshold value.

Here, if this rate of change is below the threshold value, it is determined that a contamination error has occurred, and the processing proceeds to step S19. On the other hand, if the rate of change is at or above the threshold, the processing proceeds to step S21.

Next, in step S19, since it was determined in step S18 that the negative rate of change of the counter electrode terminal voltage was below the specified threshold, it is determined whether or not the display unit 41 has notified the user that a contamination error seems to have occurred.

Here, if the user has been notified, the processing proceeds to step S21, but if the user has not been notified, the processing proceeds to step S20.

Next, in step S20, the display unit 41 displays that a contamination error has occurred in order to notify of the occurrence of a contamination error that has not yet been reported.

Next, in step S21, since it was determined in step S18 that the rate of change of the counter electrode terminal voltage was at or above the specific threshold value, or it was determined in step S19 that the user has been notified of the occurrence of a contamination error, it is determined whether or not to continue the culture. Here, if the user chooses to continue the culture, the processing returns to step S11 and measurement error determination processing is repeated. On the other hand, if the user chooses not to continue the culture, the processing is ended.

Next, in step S22, after notifying of the occurrence of an immersion error in step S15, and notifying of the occurrence of a contamination error in step S20, it is selected whether or not to halt the culture.

At this point, the user can choose whether or not to halt the culture, but normally if mold or the like has adhered, it is determined that the culture cannot be continued, and the processing is ended.

Main Features As shown in FIG. 10, the cell culture analysis device 1 of this embodiment comprises the voltage application unit 11*a*, the current measurement unit 11*b*, the voltage measurement unit 11*c*, and the analysis unit 42. The voltage application unit 11*a* applies voltage to the sensing unit 31*a* in a state in which the sensing unit 31*a* of the sensor 30, which includes the working electrodes 31*aa* and 31*ad*, the counter electrode 31*ab*, and the reference electrode 31*ac*, is immersed in the medium X. The current measurement unit 11*b* measures the current flowing through the sensor 30 based on the voltage applied to the sensing unit 31*a*. The analysis unit 42 calculates the concentrations of glucose and lactic acid contained in the medium X on the basis of the measurement result from the current measurement unit 11*b*. The voltage measurement unit 11*c* measures the terminal voltage of the counter electrode 31*ab* included in the sensing unit 31*a* based on the voltage applied by the voltage application unit 11*a*. The analysis unit 42 detects a measurement error on the basis of the terminal voltage of the counter electrode 31*ab* measured by the voltage measurement unit 11*c*.

Consequently, if the sensing unit 31*a* of the sensor 30 is not sufficiently immersed in the medium X, or if mold or another such impurity has adhered to the surface of the sensor 30, the occurrence of measurement errors can be detected with high accuracy by monitoring changes in the counter electrical terminal voltage indicating a certain behavior.

As a result, measurement errors caused by improper sensor immersion, contamination, or the like can be detected with high accuracy, and glucose, lactic acid, or some other such measurement target can be accurately measured.

Other Embodiments

An embodiment of the present invention was described above, but the present invention is not limited to the above embodiment, and various changes are possible without departing from the gist of the invention.

(A)

In the above embodiment, an example was given in which the present invention was realized as a sample measurement device and a sample measurement method. However, the present invention is not limited to this.

For example, the present invention may be realized as a sample measurement program that causes a computer to execute the sample measurement method featuring the sample measurement device described above.

This sample measurement program is stored in a memory (storage unit) installed in the sample measurement device, and the CPU reads the sample measurement program stored in the memory and causes the hardware to execute the various steps. More specifically, the CPU reads the sample measurement program and executes the above-mentioned voltage application step, current measurement step, concentration measurement step, counter terminal voltage measurement step, and measurement error detection step, which allows the same effect as above to be obtained.

Also, the present invention may be realized as a recording medium that stores a sample measurement program.

(B)

In the above embodiment, an example was given in which the concentration measurement unit and the measurement error detection unit included in the sample measurement device of the present invention were provided as the analysis unit 42 on the control unit 4 side. However, the present invention is not limited to this.

For example, the configuration may be such that the control unit 12 on the analysis unit 2 side functions as a concentration measurement unit and a measurement error detection unit.

(C)

In the above embodiment, an example was given in which the sensor 30 included the two working electrodes 31*aa* and 31*ad* for glucose measurement and lactic acid measurement, but the present invention is not limited to this.

For example, the sensor may have a three-electrode configuration provided with one working electrode, one counter electrode, and one reference electrode.

(D)

In the above embodiment, an example was given in which the sample measurement device of the present invention was applied to the cell culture analysis device 1. However, the present invention is not limited to this.

For example, the present invention may be applied to a device other than one used in cell culture, and to a measurement device that measures a sample.

(E)

In the above embodiment, an example was given in which the sensor 30 measured the concentrations of glucose and lactic acid as the measurement targets. However, the present invention is not limited to this.

For example, the measurement target is not limited to glucose and lactic acid, and may be some other substance.

(F)

In the above embodiment, an example was given in which the sensor 30 was used in a state of having been bent at the bent portion 32. However, the present invention is not limited to this.

For example, a sensor that has not been bent may be used.

Here again, by using a configuration in which a plurality of sensors are linked by a linking portion at the upper end portion of the main body of each sensor affords the same effect as described above, that of improving the positional accuracy of the sensors.

(G)

In the above embodiment, an example was given in which the sensor 30 was used, which was substantially an upside-down T-shape. However, the present invention is not limited to this.

For example, a substantially I-shaped or substantially L-shaped sensor may be used instead.

(H)

In the above embodiment, an example was given in which the sample measurement device of the present invention was applied to a cell culture analysis device. However, the present invention is not limited to this.

For example, the present invention may be applied to a device that measures samples unrelated to cell culture.

INDUSTRIAL APPLICABILITY

The sample measurement device of the present invention exhibits the effect that measurement errors attributable to improper sensor immersion, contamination, etc., can be detected in order to take more accurate measurements, and is therefore not limited to the field of cell culture, and is broadly applicable to devices that measure various kinds of sample.

REFERENCE SIGNS LIST

1 cell culture analysis device (sample measurement device)
2 analysis unit
3 incubator
3*a* door
4 control unit
5 electrical cable
11 electrochemical measurement unit
11*a* voltage application unit
11*b* current measurement unit
11*c* voltage measurement unit (counter electrode terminal voltage measurement unit)
12 control unit
13 storage unit
14 communication unit
20 sensor-equipped culture module
21 main body
22 pull-out part
23 lifting mechanism
25 well plate
25*a* well
27 bottom plate
28 sensor unit
30 sensor (sample measurement sensor)
31 main body
31*a* sensing unit (electrode unit)
31*aa* working electrode

31*ab* counter electrode
31*ac* reference electrode
31*ad* working electrode
31*b* connecting terminal portion
31*c* electrode
32 bent portion
33 linking portion
34 base material (PET sheet)
35 reagent layer
36 adhesive layer
37 protective film
38 insulating layer
41 display unit
42 analysis unit (concentration measurement unit, measurement error detection unit)
C1 biological safety cabinet
i current
X medium

The invention claimed is:

1. A sample measurement device, comprising:
a voltage application unit configured to apply voltage to an electrode unit including at least a working electrode, a counter electrode, and a reference electrode of a sample measurement sensor in a state in which the electrode unit is immersed in a sample;
a current measurement unit configured to measure a current flowing through the sample measurement sensor by the voltage applied to the electrode unit;
a concentration measurement unit configured to calculate a concentration of an analyte contained in the sample on the basis of a measurement result from the current measurement unit;
a counter electrode terminal voltage measurement unit configured to measure a terminal voltage of the counter electrode included in the electrode unit in a state in which a voltage is being applied by the voltage application unit; and
a measurement error detection unit configured to detect a measurement error on the basis of the terminal voltage of the counter electrode measured by the counter electrode terminal voltage measurement unit,
wherein the measurement error detection unit detects a contamination error attributable to an admixture of an impurity other than the analyte.

2. The sample measurement device according to claim 1, wherein the measurement error detection unit determines that there is a the contamination error has occurred when a fluctuation rate of a measurement result obtained by the counter electrode terminal voltage measurement unit is at or below a specific threshold.

3. The sample measurement device according to claim 2, wherein the measurement error detection unit sets a skip period in which the measurement error detection unit does not determine whether the contamination error has occurred until a specific time has elapsed since the voltage was applied from the voltage application unit, and determines whether a the contamination error has occurred after the skip period has elapsed.

4. The sample measurement device according to claim 1, wherein the measurement error detection unit detects an improper immersion error caused by improper immersion in which the electrode unit is not properly immersed in the sample.

5. The sample measurement device according to claim 4, wherein the measurement error detection unit sets a skip period in which the measurement error detection unit does not determine whether the improper immersion error has occurred until a specific time has elapsed since the voltage was applied from the voltage application unit.

6. The sample measurement device according to claim 5, wherein the measurement error detection unit determines that the improper immersion error has occurred when the terminal voltage of the counter electrode measured by the counter electrode terminal voltage measurement unit during the skip period is outside a specific range.

7. The sample measurement device according to claim 6, wherein the voltage application unit stops applying voltage when it is determined that the improper immersion error has occurred.

8. The sample measurement device according to claim 1, further comprising a display unit configured to display a detection result for the measurement error in the measurement error detection unit.

9. The sample measurement device according to claim 1, wherein the sample measurement sensor comprises the electrode unit including at least the working electrode, the counter electrode, and the reference electrode,
in the working electrode, a reagent applied to a surface of the working electrode is covered with a protective film,
in the reference electrode, a surface of the reference electrode is covered with the protective film, and
in the counter electrode, an electrode portion is exposed to the sample.

10. The sample measurement device according to claim 9, wherein a surface of electrode portion of the working electrode is formed in a circular shape in plan view.

11. The sample measurement device according to claim 9, wherein in the counter electrode, a surface of the electrode unit is formed in a rectangular shape in plan view.

12. The sample measurement device according to claim 9, wherein the electrode portion of the counter electrode is formed from carbon.

13. A sample measurement method, comprising:
a voltage application step of applying voltage to an electrode unit in a state in which the electrode unit including at least a working electrode, a counter electrode, and a reference electrode of a sample measurement sensor is immersed in a sample;
a current measurement step of measuring a current flowing through the sample measurement sensor by the voltage applied in the voltage application step;
a concentration measurement step of calculating a concentration of an analyte contained in the sample on the basis of a measurement result in the current measurement step;
a counter electrode terminal voltage measurement step of measuring a terminal voltage of the counter electrode included in the electrode unit in a state in which voltage is being applied in the voltage applying step; and
a measurement error detection step of detecting a measurement error on the basis of the terminal voltage of the counter electrode measured in the counter electrode terminal voltage measurement step,
wherein the measurement error detection unit detects a contamination error attributable to an admixture of an impurity other than the analyte.

14. A sample measurement program that causes a computer to execute a sample measurement method comprising:
a voltage application step of applying voltage to an electrode unit in a state in which the electrode unit including at least a working electrode, a counter electrode, and a reference electrode of a sample measurement sensor is immersed in a sample;

a current measurement step of measuring a current flowing through the sample measurement sensor by the voltage applied in the voltage application step;

a concentration measurement step of calculating a concentration of an analyte contained in the sample on the basis of a measurement result in the current measurement step;

a counter electrode terminal voltage measurement step of measuring a terminal voltage of the counter electrode included in the electrode unit in a state in which voltage is being applied in the voltage applying step; and a measurement error detection step of detecting a measurement error on the basis of the terminal voltage of the counter electrode measured in the counter electrode terminal voltage measurement step.

* * * * *